United States Patent [19]
Yokota

[11] Patent Number: 5,065,380
[45] Date of Patent: Nov. 12, 1991

[54] DIFFRACTION GRATING FOR AN OPTICAL PICKUP DEVICE

[75] Inventor: Taizo Yokota, Higashihiroshima, Japan

[73] Assignee: Sharp Kabushiki Kaisha, Osaka, Japan

[21] Appl. No.: 397,189

[22] Filed: Aug. 23, 1989

[30] Foreign Application Priority Data

Sep. 2, 1988 [JP] Japan .................................. 63-219712

[51] Int. Cl.$^5$ .............................................. G11B 7/00
[52] U.S. Cl. .................. 369/44.12; 369/109; 369/44.41; 359/569
[58] Field of Search ...................... 369/44.12, 109, 110, 369/112, 44.41, 44.37, 44.11; 350/162.2, 162.23, 162.17, 162.11

[56] References Cited

U.S. PATENT DOCUMENTS

| | | | |
|---|---|---|---|
| 4,425,034 | 1/1984 | von Rosmalen | 369/44.41 |
| 4,733,065 | 3/1988 | Hoshi et al. | |
| 4,945,529 | 7/1990 | Ono et al. | 369/110 |
| 4,983,017 | 1/1991 | Tsuji et al. | 369/109 |

FOREIGN PATENT DOCUMENTS

| | | |
|---|---|---|
| 123048 | 10/1984 | European Pat. Off. . |
| 216637 | 4/1987 | European Pat. Off. . |
| 228620 | 7/1987 | European Pat. Off. . |
| 273356 | 7/1988 | European Pat. Off. . |
| 351953 | 1/1990 | European Pat. Off. . |
| 3522849 | 1/1986 | Fed. Rep. of Germany . |

Primary Examiner—Roy N. Envall, Jr.
Assistant Examiner—Thang V. Tran

[57] ABSTRACT

An optical pickup device for focusing an irradiating ray from a light emitting element on a recording medium and letting a reflected ray reflected from this recording medium focus on a light receiving element is characterized in comprising a diffracting element disposed before the light emitting element and the light receiving element, at least a first diffraction region included in the diffracting element for separating the irradiating ray from the light emitting element into a main beam and sub-beams shifted from the main beam in a direction perpendicular to a track direction of the track where the main beam is focused, a second diffraction region included in the diffracting element for directing a reflected ray of the main beam reflected from the recording medium onto a main light receiving element and directing reflected rays of the sub-beams onto sub-light receiving elements, and an arithmetic circuit for detecting a tilt error signal showing the sub-beam's focusing condition according to the output of the sub-light receiving elements, whereby an optical pickup device does not require installment of any separate tilt sensor for detection of a tilt signal, and also enables prevention of increasing the number of components and the increase of cost as a result of increased assembly steps and/or the required man-hours.

17 Claims, 13 Drawing Sheets

DIFFRACTION GRATING FOR AN OPTICAL PICKUP DEVICE

FIELD OF THE PRESENT INVENTION

The present invention relates to an optical pickup device used in CD (compact disk) player and an optical video disk device.

BACKGROUND OF THE PRESENT INVENTION

When using an optical pickup device in a CD player or the like, a diffracting element (hologram element) is utilized for reducing the number of parts comprising the optics.

An optical pickup device of this kind is shown in FIGS. 10 and 11.

As shown in FIG. 10, a laser beam emitted from a light emitting element 11 first passes through a diffracting element 12. A 0th-order diffracted ray having passed through a diffracting element 12 is focused on a disk 15 through a collimator lens 13 and an objective lens 14.

Then, a reflected ray from this disk 15 passes the diffracting element 12 in the opposite direction through the objective lens 14 and the collimator lens 13. The diffracting element 12 is divided into diffraction regions 12a and 12b being different in diffraction angle by a parting line along a track direction, as shown in FIG. 10. Hence, a 1st-order diffracted ray diffracted in the diffraction region 12a is focused on a light receiving elements 16a and 16b. On the other hand, a 1st-order ray diffracted in the diffraction region 12b is focused on light receiving elements 16c and 16d.

Individual output signals Sa-Sd from these light receiving elements 16a-16d are respectively converted into a focusing error signal FE, a tracking error signal TE and a reproduced information signal RF by means of an arithmetic circuit shown in FIG. 11. The arithmetic operation represented by the following formula, according to a kind of knife edge method, is performed on the output signals Sa-Sd using addition circuits 17 and 18 and a subtraction circuit 19 whereby the focusing error signal FE is detectable.

$$FE=(Sb+Sc)-(Sa+Sd)$$

The arithmetic operation represented by the following formula, according to a push-pull method, is performed on the output signals Sa-Sd using addition circuits 20 and 21 and a subtraction circuit 22 whereby the tracking error signal TE is detectable.

$$TE=(Sc=Sd)-(Sa+Sb)$$

The reproduced information signal RF is detectable by adding all the output signals Sa-Sd, using the addition circuits 20 and 21 and the other addition circuit 23, according to the following formula.

$$RF=Sa+Sb+Sc+Sd$$

The aforementioned optical pickup device, however, has its disk 15, for instance, warped so that, if an incident optical beam does not hit the disk surface vertically, it results in coma-aberration occurring in a beam spot on the disk surface, thereby causing cross talk from the adjacent tracks. With such an optical pickup device, therefore, it is necessary to provide a tilting mechanism for tilt angle adjustment according to an inclination of the disk surface for compensation thereof so that the optical beam is always incident upon the surface of the disk 15 vertically, even if the disk 15 is warped.

In the case that a tilt angle is to be adjusted by means of the tilting mechanism, it has hitherto been a usual practice to provide the tip of the optical pickup device with a tilt sensor 24 as shown in FIGS. 12(a) and (b) whereby the tilt of the disk surface has been detected.

This tilt sensor 24 is made up of a light emitting element 25 and a pair of light receiving elements 26a and 26b. The light emitting element 25 is arranged that an irradiating ray therefrom is emitted toward the disk 15, while the light receiving elements 26a and 26b are disposed on both sides of the light emitting element 25 in a radial direction with regard to the disk 15.

In this arrangement, as shown in FIG. 12(a), when the disk 15 is warped upward as being radially outward, an irradiating ray from the light emitting element 25 is reflected by the disk 15 outward and the quantity of received ray of the outer light receiving element 26b is larger than that of the inner light receiving element 26a. Also, as shown in FIG. 12(b), when the disk 15 is warped downward as being radially outward, an irradiating ray from the light emitting element 25 is reflected by the disk 15 inward so that the quantity of received ray of the inner light receiving element 26a is larger than that of the outer light receiving element 26b. Hence, when the outputs from the light receiving elements 26a and 26b are inputted into a subtraction circuit 27, shown in FIG. 13, a tilt error signal in accordance with an inclination of the disk surface is obtainable.

However, providing the tilt sensor 24 independent of the optical pickup device as mentioned above means increasing the number of parts of the device. Also, it is necessary to do initial adjustment so that the tilt error signal released from the subtraction circuit 27 with respect to a warp-free and flat reference disk is "0". This results in an increased assembly man-hours of the product.

Thus, a conventional optical pickup device has to be provided with an independent tilt sensor 24 for adjustment of tilt angle, and this meant an increased number of parts and necessity of initial adjustment, and these are naturally accompanied by a cost increase of the product.

SUMMARY OF THE PRESENT INVENTION

It is an object of the present invention to provide an optical pickup device designed to be capable of detecting a tilt error caused by warping et cetera of a recording medium.

Another object of the present invention is to provide an optical pickup device designed to be capable of detecting a tilt error caused by warping et cetera of a recording medium without providing a separate tilt sensor so as to prevent an increase in the manufacturing cost due to an increase in the number of constituent parts and increase of the assembly man-hours for initial adjustment.

In order to accomplish the aforesaid objects, an optical pickup device of the present invention is designed to focus an irradiating ray emitted from a light emitting element onto a recording medium, and focus a reflected ray reflected from the recording medium onto light receiving elements. In front of the light emitting element and the light receiving elements there is disposed a diffracting element. This diffracting element includes at least a first diffraction region for dividing the irradiating ray emitted from the light emitting element into a main beam and sub-beams shifted from the main beam in a direction perpendicular to a track direction of the track where the main beam is being irradiated upon and a second diffraction region where a reflected ray of the main beam from the recording medium is caused to be irradiated onto a main light receiving element and at the same time reflected rays of the sub-beams are caused to be irradiated onto sublight receiving elements. The optical pickup device of the present invention is characterized in an arithmetic circuit for detecting a tilt error signal showing a focusing condition of the sub-beams according to the output of the aformentioned sub-light receiving elements.

In the aforementioned construction, the irradiating ray emitted from the light emitting element passes through the diffracting element. Main beams which are among the diffracted rays having passed through the diffracting element are focused on the recording medium (The aforesaid rays include the 0th-order diffracted rays. The same shall apply hereinafter). These main beams may be normally any of all 0th-order diffracted rays which have respectively passed through the diffraction regions. In order to ensure against the difference in quantity of light according to the respective diffraction regions where the diffracted rays have passed through, it is so arranged that the 0th-order diffraction efficiencies in the individual regions are as equal as possible. These main beams are for reproducing the information stored in the recording medium, at the same time are for detecting a focusing error signal by the knife edge method or the astigmatism method or the like. These main beams may also be applicable for detection of a tracking error signal by the push-pull method et cetera.

Also, of the diffracted rays having passed the first diffraction region of the diffracting element, the diffracted rays other than the aforementioned main beams constitute sub-beams and are focused on a position shifted from the main beam in a direction perpendicular to the track direction of the track where the main beam is being irradiated upon the recording medium. When a 0th-order diffracted ray is adopted as a main beam, it is proper to use ±1st-order diffracted rays as these sub-beams.

When the tracking error signal is detected by the 3-spot method, it may as well be possible to provide a third diffraction region in the diffracting element, in which tracking error detection sub-beams shifted back and forth from the main beam in a track direction of the track where the main beams are irradiated are separated.

The reflected rays of the main beams reflected from the recording medium pass through the second diffraction region and the diffracted rays therefrom are irradiated onto a main light receiving element. The reflected rays of the sub-beams pass through this second diffraction region and the diffracted rays are caused to be irradiated onto a second light receiving element. Since the optical axes of these reflected rays are inclined to each other, the same diffracted ray in the second diffraction region can be utilized. When the main beams consist of the 0th-order diffracted rays from the diffracting element, it means that as these reflected rays the diffracted rays other than the 0th-order diffracted rays are utilized. In this case, if the second diffraction region is provided with a blaze property so that a luminous intensity of, for instance, the +1st-order diffracted ray alone is raised, a sufficient sensitivity may be secured even when only one diffracted ray is to be utilized.

The main light receiving element is divided into 2 or 4 light receiving regions when a focusing error signal is to be detected by the knife edge method or the astigmatism method. A reproduced information signal can be obtained by adding all of the respective outputs from these light receiving regions. A focusing error signal is obtainable by performing arithmetic operations on the outputs from these light receiving regions according to the respective formulae. The same performance applies to the case where a tracking error signal is detected by the push-pull method. When a tracking error signal is to be detected by the 3-spot method, the aforementioned tracking error detection sub-beams having passed through the second diffraction region are arranged to be focused onto tracking error detection sub-light receiving elements disposed before and after the main light receiving element along a track direction.

The sub-light receiving elements are normally disposed before and after the main light receiving element along a direction perpendicular to the track direction. When the knife edge method is employed, a light receiving area of the sub-light receiving element is divided by a parting line along the border line of the second diffraction region. Hence, if the difference between outputs from these light receiving regions is determined, it is possible to detect a focusing condition of the sub-beams. This focusing condition of the sub-beams is indicating an inclination in a direction perpendicular to the track direction of the recording medium when the main-beams are in focus on the recording medium.

Hence, in the case of an optical disk, for instance, it means that an inclination in a radial direction caused by warp and the like, whereby it is possible to obtain a tilt error signal. This tilt error signal is sent to a tilting mechanism whereby through adjustment of the tilt angle of the optical pickup device the main beams are always so adjusted to be focused the recording medium vertically.

When the sub-beams are composed of two beams on both sides of the main beams as in the case where, for instance, ±1st-order diffracted rays of the aforementioned first diffraction region are utilized as sub-beams the outputs from the respective light receiving regions of the two sub-light receiving elements disposed in two positions are added alternately and then the difference between these results is determined, whereby an inclination of the recording medium is detectable even when the main beam is out of focus. If the main beams should always be in focus, detection is possibly feasible by means of one sub-beam, and it is also possible to use the focusing error signal by means of the main beam instead of the other sub-beam. In this case, the first diffraction region is provided with a blaze property thereby to increase the luminous intensity of the diffracted ray as a sub-beam, whereby it is possible to ensure an enough detection sensitivity even with a single sub-beam.

Also, since this tilt error signal is to be detected by the focusing condition of the sub-beams, it is also possible to be detected not only by the knife edge method but also by some other focusing error signal detection means. In such a case, it is convenient to use a method of the same principle as the focusing error signal detection means and, for instance, when the astigmatism method is used, it is advisable to utilize the property of a cylindrical lens imparted to the second diffraction region for the reflected rays of the main beams. By the way, this diffracting element may further be provided with the properties of a condensing lens for condensing reflected rays and irradiating rays.

BRIEF DESCRIPTION OF THE DRAWINGS

FIGS. 1 through 9 show an embodiment of the present invention, of which:

FIG. 1 is a perspective view showing the construction of an optical pickup device;

FIG. 2(a) is a front view of the optical pickup device showing the optical path of an irradiated ray from a light emitting element thereof;

FIG. 3(a) is a side view of the optical pickup device showing the optical path of the irradiated ray from the light emitting element thereof;

FIG. 3(b) is a side view of the optical pickup device showing the optical path of the reflected ray from the disk;

FIG. 4 is a plan view of a diffracting element and light receiving elements;

FIG. 5 is a block diagram showing the construction of signal detection circuits;

FIG. 6 is a partial bottom view of the disk;

FIG. 8 is a front view showing diagramatically tilt error detection sub-beams when the disk is inclined;

FIG. 9 is a plan view showing another construction of the diffracting element.

FIGS. 10 through 13 are given to show a conventional example, of which:

FIG. 10 is a perspective view showing the construction of an optical pickup device using a diffracting element;

FIG. 11 is a block diagram showing the construction of signal detection circuits;

FIG. 12 shows the tilt sensor, of which FIG. 12(a) is a front view of the essential parts when the peripheral portion of a disk is warped upward, and FIG. 12(b) is a front view of the essential parts when the peripheral portion of a disk is warped downward; and FIG. 13 is a block diagram showing the construction of a tilt error signal detection circuit.

DESCRIPTION OF THE EMBODIMENTS

A preferred embodiment of the present invention is described below under reference to FIGS. 1 through 9.

i) Construction of a preferred embodiment

This embodiment relates to an optical pickup device such as a CD player and the like.

Figure 1:
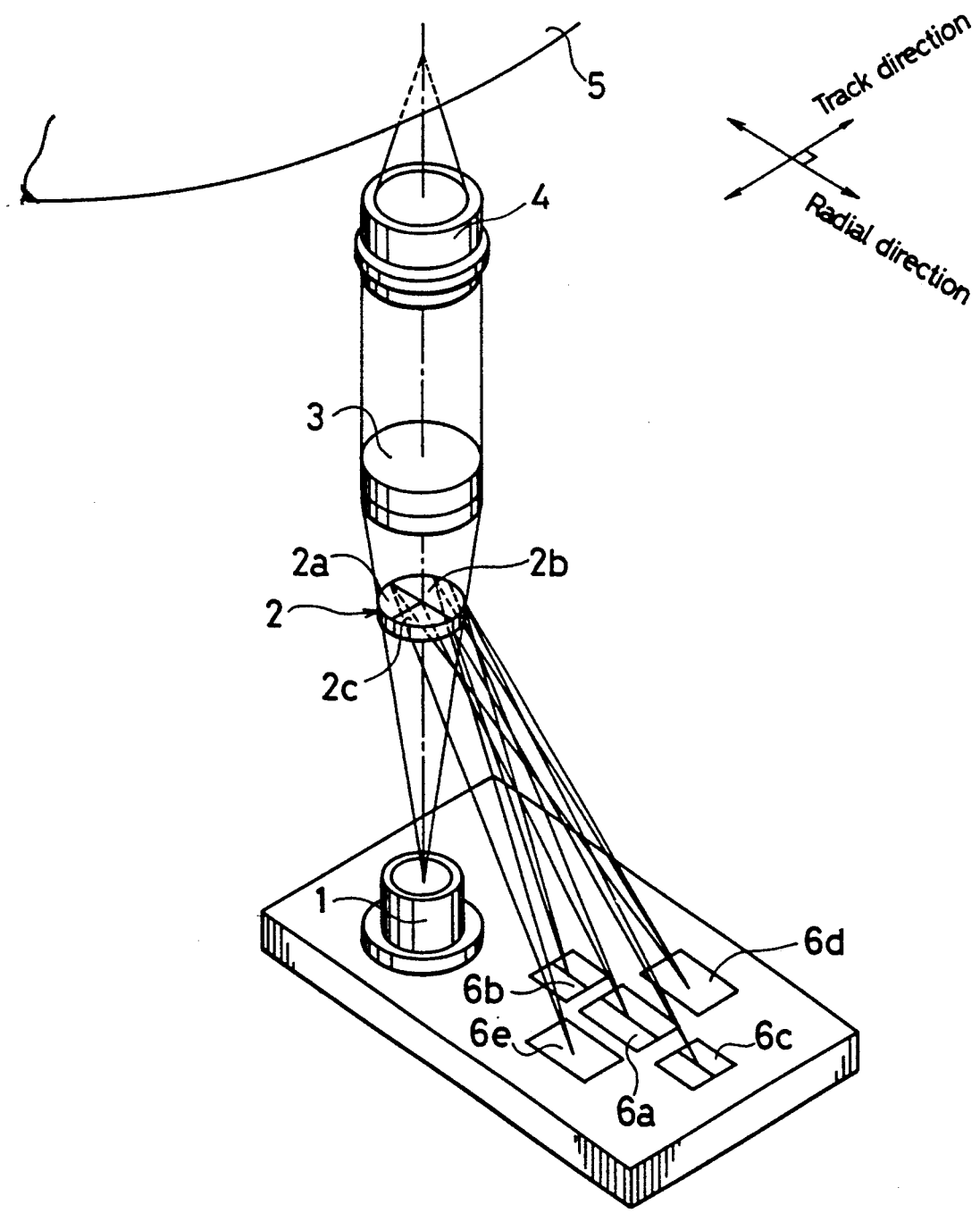

As shown in FIG. 1, there are disposed before a light emitting element 1 of an optical pickup device, a diffracting element 2, a collimator lens 3 and an objective lens 4, and a laser beam emitted from this light emitting element 1 is caused as an irradiating ray to be focused on a disk 5 as a recording medium.

A diffraction area of the diffracting element 2 is divided into two regions along a radial direction of the disk 5, and on either thereof is formed a second diffraction region 2b. Another divided region is further divided into two regions along a track direction of the disk 5 to form a first diffraction region 2a and a third diffraction region 2c respectively.

The collimator lens 3 is a lens for making parallel irradiated rays from the light emitting element 1 having passed through the diffracting element 2. The objective lens 4 is a lens for focusing these rays on the disk 5. These lenses 3 and 4 are so designed that the irradiating rays having been reflected by the disk 5 are again led into the diffracting element 2.

On one side adjacent to the light emitting element 1 in a radial direction are disposed light receiving elements 6a-6e. These light receiving elements 6a-6e are disposed with a main light receiving element 6a at the center, tilt error detection sub-light receiving elements 6b, 6c on the inner peripheral side and the outer peripheral side in a radial direction, and tracking error detection sub-light receiving elements 6d, 6e before and after the main light receiving element 6a along a track direction. And the aforementioned reflected rays are focused on the light receiving elements 6a-6e through the diffracting element 2.

A diffraction grating is formed in the aforementioned diffraction region 2a of the diffracting element 2, as seen from FIG. 2(a), so that a irradiated ray A from the light emitting element 1 is divided into a 0th-order diffracted ray $A_{1a}$, and $\pm 1$st-order diffracted rays $A_{+1a}$, $A_{-1a}$ shifted before and after from the 0th-order diffracted ray $A_{0a}$ along a radial direction. The 1st-order diffracted rays $A_{+1a}$, $A_{-1a}$ diffracted in the first diffraction region 2a serves as tilt error detection sub-beams $A_{+1a}$, $A_{-1a}$ for detecting the tilt of the disk 5. In this first diffraction region 2a the other diffracted rays of the irradiated ray A and all transmitting rays of reflected rays B are not utilized.

The third diffraction region 2c, as seen from FIG. 3(a), has formed therein a diffraction grating for dividing the irradiated ray A from the emitting element 1 into a 0th-order diffracted ray $A_{0c}$ and $\pm 1$st-order diffracted rays $A_{+1c}$, $A_{-1c}$ shifted before and after from the 0th-order diffracted ray $A_{0c}$ along a track direction. These $\pm 1$st-order diffracted rays $A_{+1c}$, $A_{-1c}$ are converted by a 3-beam method into tracking error detection sub-beams $A_{+1c}$, $A_{-1c}$ for detecting the tracking error. By the way, in this third diffraction region 2c the other diffracted rays of the irradiated ray A and all transmitting rays of the reflected rays B are not utilized.

The second diffraction region 2b has formed therein a diffraction grating to be described below and in this region a 0th-order diffracted ray $A_{0b}$ of the irradiated ray A is only utilized as shown in FIG. 3(a). And the aforementioned 0th-order diffracted ray $A_{0a}$ in the first diffraction region 2a, the 0th-order diffracted ray $A_{0c}$ in the third diffraction region 2c and this 0th-order diffracted ray $A_{0b}$ in the second diffraction region 2b constitute main beams $A_0$ for reproducing recorded information in the disk 5 as well as for detecting the focusing error. For this reason the 0th-order diffraction efficiencies in the individual regions 2a, 2b, 2c are arranged to be as equal as possible so that the luminous intensity distribution of the main beam $A_0$ becomes to be symmetric.

Figure 2:
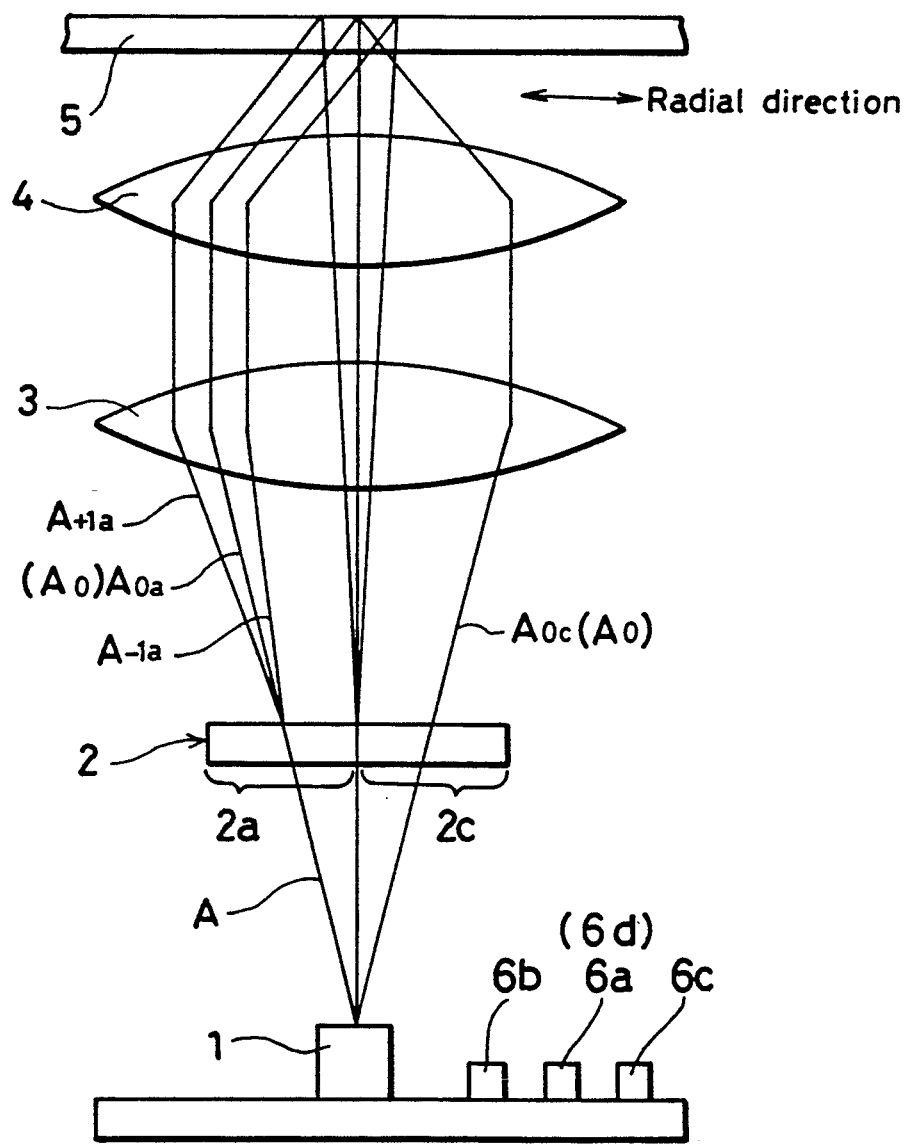
Figure 2B:
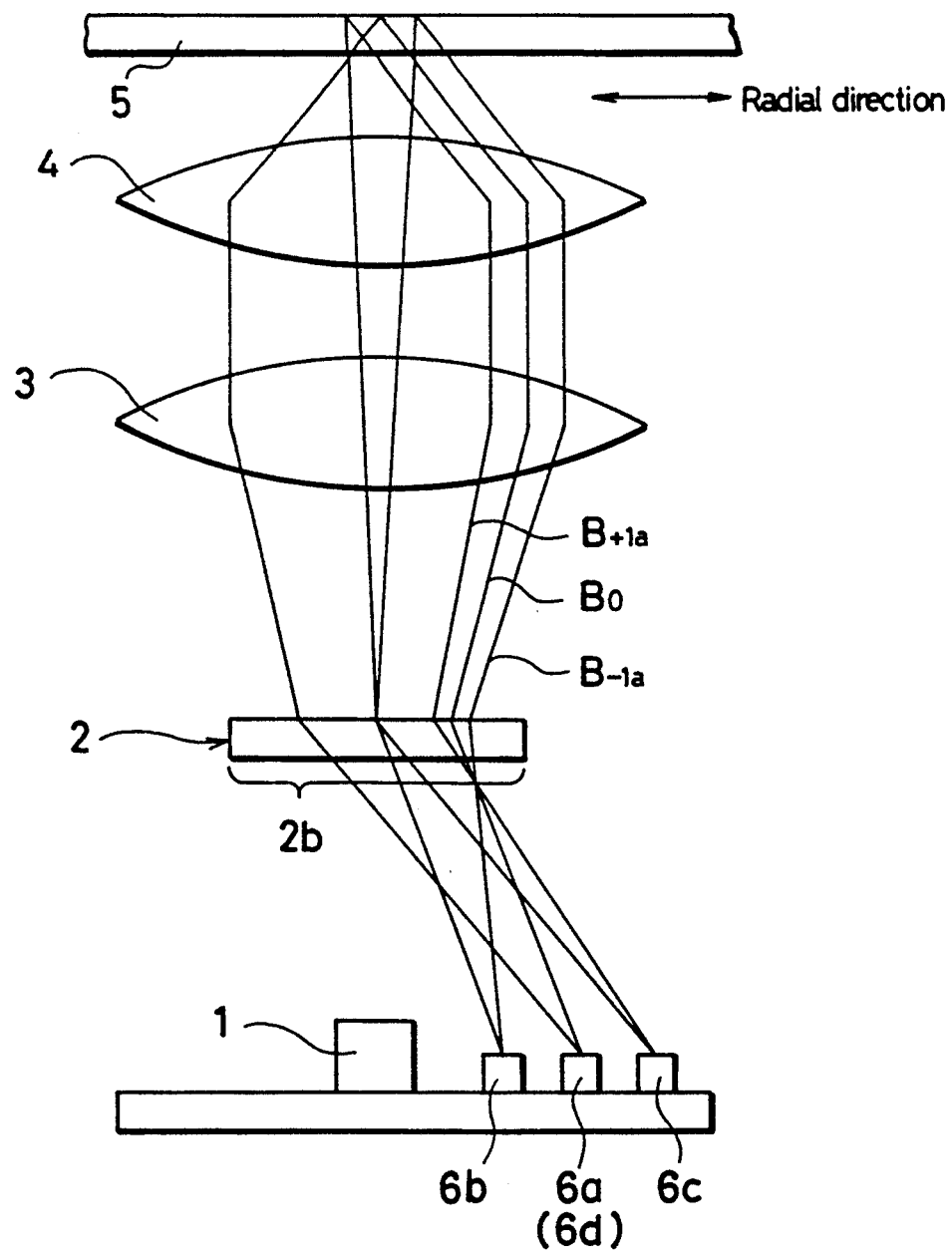
FIG. 2(b) is a front view of the optical pickup device showing the optical path of a reflected ray from a disk.
Figure 3:
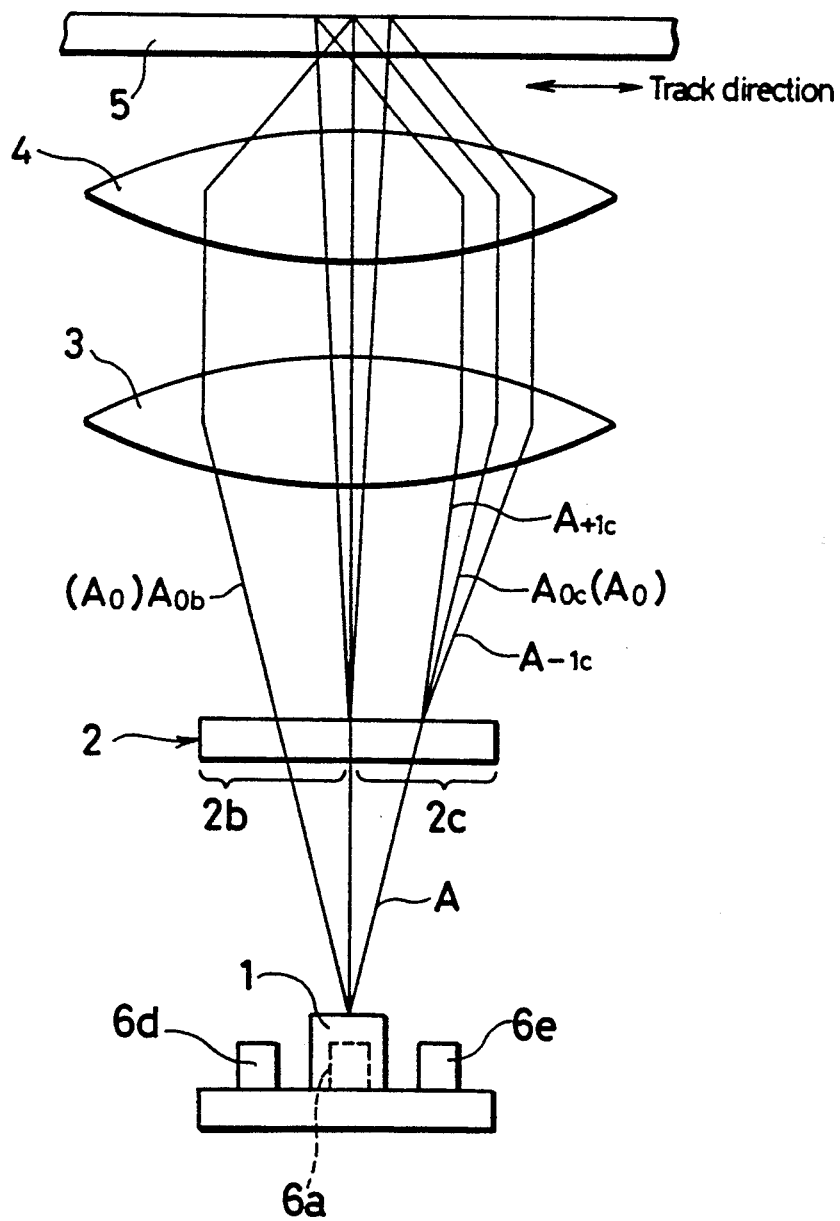
Figure 3:
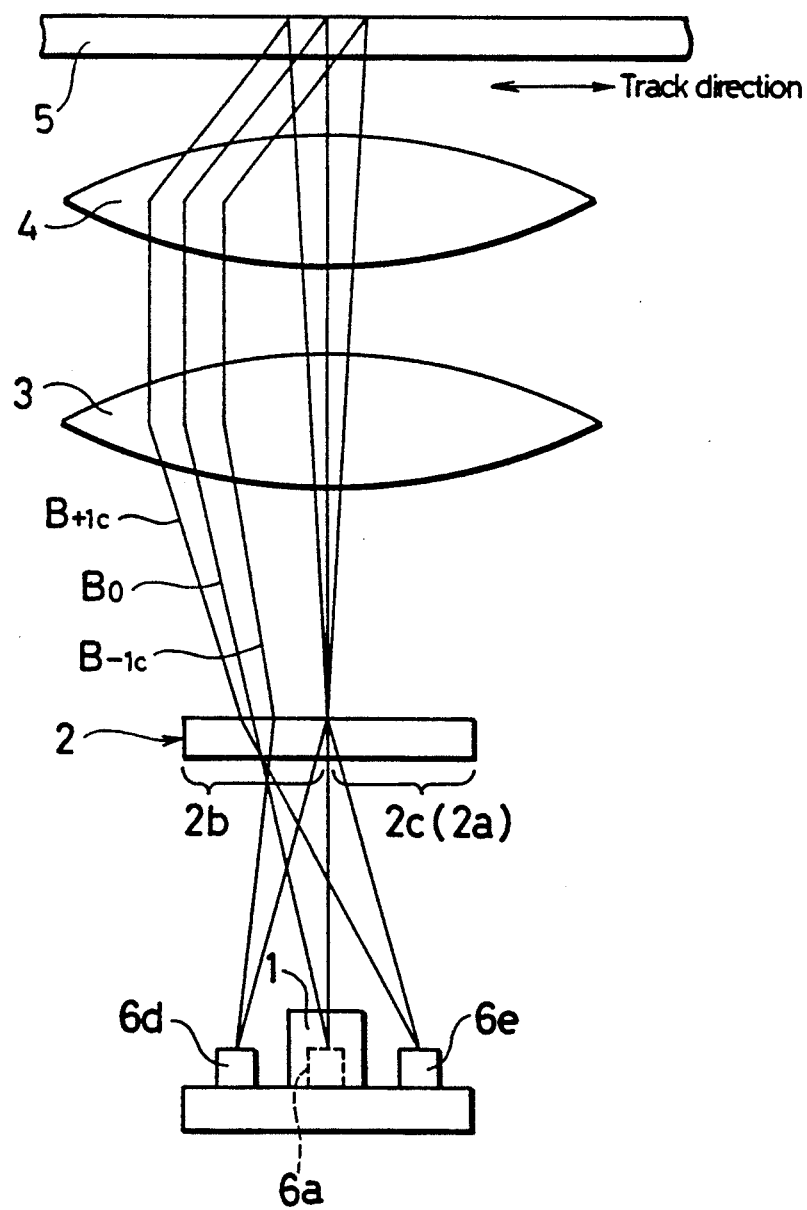

This second diffraction region 2b is designed wherein such a diffraction grating is formed therein so that +1st-order diffracted rays of the reflected rays B are irradiated on each light receiving elements 6a-6e. Since the reflected rays B are composed of the 0th-order diffracted rays and the $\pm 1$st-order diffracted rays in the individual diffraction regions 2a, 2b and 2c, each ray of the reflected rays B has a different optical axis. Hence, as shown in FIG. 2(b), the reflected rays $B_{+1a}$, $B_{-1a}$ of the tilt error detection sub-beams $A_{+1a}$, $A_{-1a}$ are irradiated on the tilt error detection sub-light receiving elements 6c, 6b respectively. Also, as shown in FIG. 3(b), the reflected rays $B_{+1c}$, $B_{-1c}$ of the tracking error detection sub-beams $A_{+1c}$, $A_{-1c}$ are irradiated on the tracking error detection sub-light receiving elements 6e, 6d. Further, as shown in FIG. 2(b) and FIG. 3(b), it is so arranged that the reflected rays $B_0$ of the main beams $A_0$ are irradiated on the main light receiving element 6a. By the way, any diffracted rays of the reflected rays B except ±1-order diffracted rays are not utilized in this second diffraction region 2b.

Figure 4:
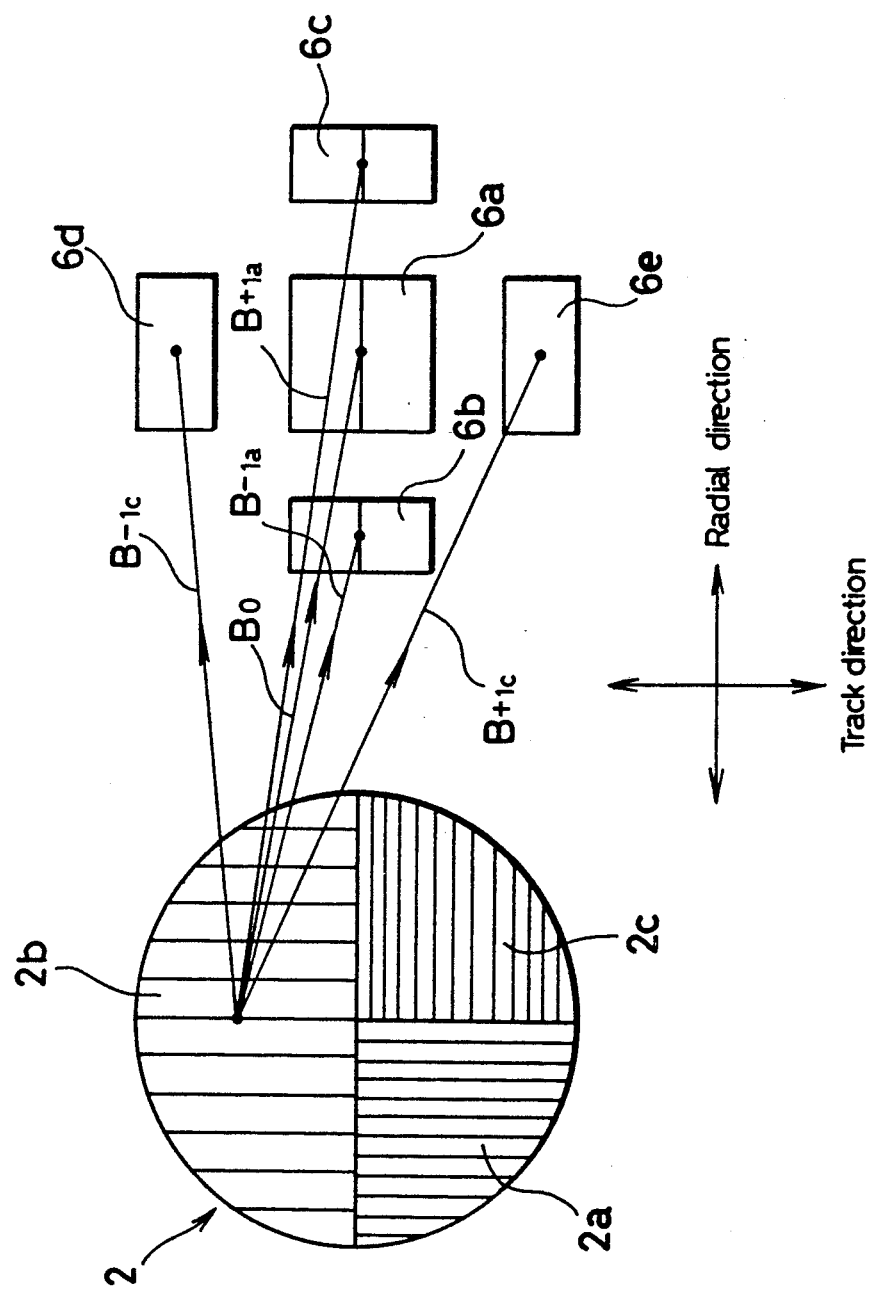

The aforementioned main light receiving element 6a, as shown in FIG. 4, has its light receiving area divided into two regions along a radial direction, and it is arranged that the reflected rays $B_0$ of the main beams $A_0$ diffracted in the second diffraction region 2b are focused on the center of this parting line. And, since this second diffraction region 2b is to divide the reflected rays $B_0$ along a radial direction, it is possible to detect the focusing error signal FE by determining, according to a kind of knife edge method, the difference between output signals released from both light receiving areas. Also, by adding signals released from both light receiving areas, it is possible to get the reproduced information signal RF.

Like the main light receiving element 6a, the tilt error detection sub-light receiving elements 6c, 6b, also have their light receiving areas divided into two regions along a radial direction respectively, and it is arranged so that on the center of this parting line are respectively focused the reflected rays $B_{+1a}$, $B_{-1a}$ of the tilt error detection sub-beam $A_{+1a}$, $A_{-1a}$ diffracted in the second diffraction region 2b. Hence, the differences of the output signals from both light receiving regions of each tilt error detection sub-light receiving elements 6c, 6b is determined, whereby it is possible to detect the focusing conditions on the disk 5 of the tilt error detection sub-beams $A_{+1a}$, $A_{-1a}$ respectively, as in the case of the main light receiving element 6a. Further by determining the difference between them, it is possible to detect the tilt between two points on the disk 5, where the tilt error detection sub-beams $A_{+1a}$, $A_{-1a}$ are irradiated, as a tilt error signal TLE.

The tracking error detection sub-light receiving elements 6e, 6d have each one light receiving area, and it is so designed that each reflected ray $B_{+1c}$, $B_{-1c}$ of the tracking error detection sub-beam $A_{+1c}$, $A_{-1c}$ diffracted in the second diffraction region 2b, is focused thereon. These tracking error detection sub-beams $A_{+1c}$, $A_{-1c}$ are shifted back and forth from the main beams $A_0$ along a track direction of the track where the main beams $A_0$ are focused, and besides they are slightly shifted inward and outward along a radial direction respectively. Hence, if the difference between the outputs released from both tracking error detection sub-light receiving elements 6d, 6e is determined, according to 3-beam method, it is possible to detect a tracking error signal TRE.

Figure 5:
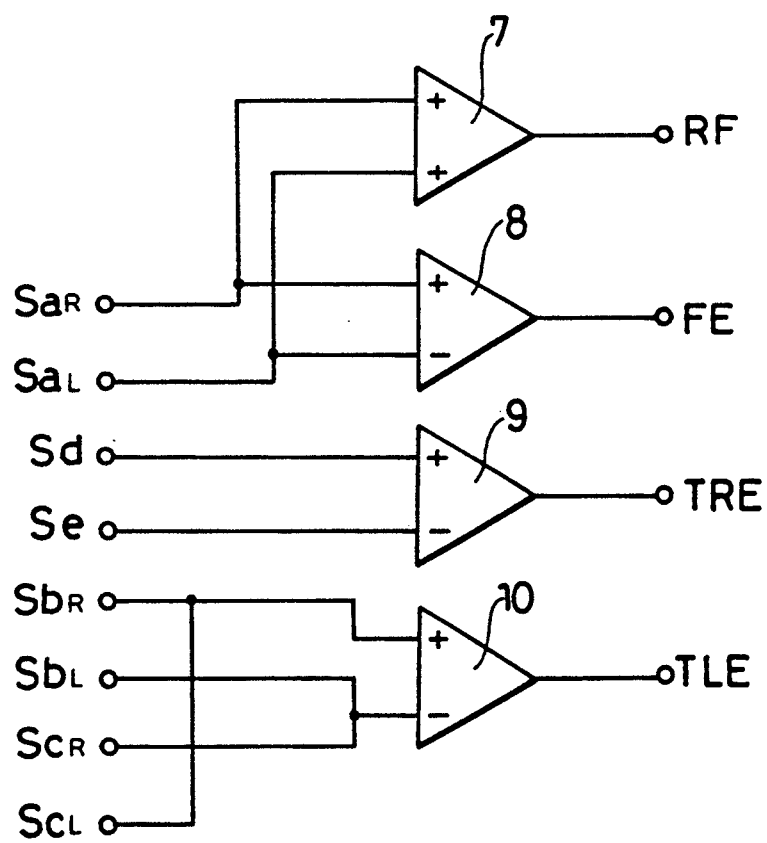
Figure 6:
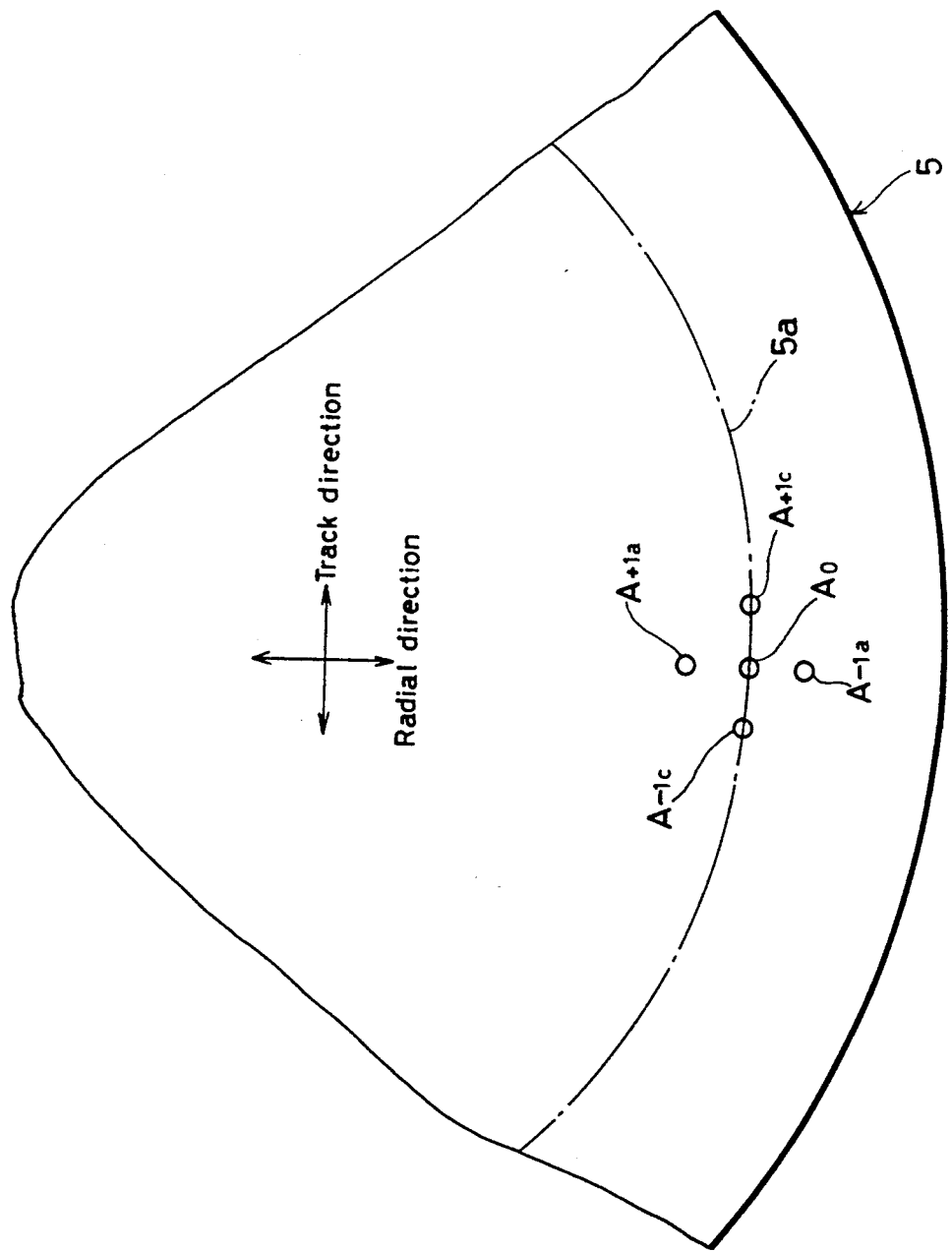

The outputs released from the aforementioned individual light receiving elements 6a-6e are so designed as to be entered into signal detection circuits shown in FIG. 5. These signal detection circuits are composed of one addition circuit 7 and three subtraction circuits 8-10. And the aforementioned reproduced information signal RF is detectable by performing an arithmetic operation with the following formula by means of an addition circuit 7 on output signals $Sa_R$, $Sa_L$ released from both light receiving regions of the main light receiving element 6a.

$$RF = Sa_R + Sa_L$$

The focusing error signal FE is detectable by performing an arithmetic operation with the following formula by means of an subtraction circuit 8 on these output signals $Sa_R$, $Sa_L$.

$$FE = Sa_R - Sa_L$$

Further, the tracking error signal TRE is detectable by performing an arithmetic operation with the following formula by means of an subtraction circuit 9 on output signals Sd, Sd released from the tracking error detection sub-light receiving elements 6d, 6e.

$$TRE = Sd - Se$$

The tilt error signal TLE is detectable by alternately adding output signals $Sb_R$, $Sb_L$ and $Sc_R$, $Sc_L$ released from the tilt error detection sub-light receiving elements 6b, 6c and after that subtracting by means of a subtraction circuit 10, and consequently the tilt error signal TLE is detected by performing an arithmetic operation with the following formula.

$$TLE = (Sb_R - Sb_L) - (Sc_R - Sc_L)$$

ii) Action of a preferred embodiment

The action of an optical pickup device having the aforementioned construction is described below.

An irradiated ray A from a light emitting element 1 first passes through a diffracting element 2. And, as shown in FIG. 2(a) and FIG. 3(a), 0th-order diffracted rays $A_{0a}$, $A_{0b}$, $A_{0c}$ having passed through all diffraction regions 2a, 2b, 2c of the diffracting element 2 are focused on a disk 5 as main beams $A_0$. Also, as shown in FIG. 2(a), ±1st-order diffracted rays $A_{+1a}$, $A_{-1a}$ diffracted in the first diffraction region 2a of the diffracting element 2 are focused, as 2-directional tilt error detection sub-beams $A_{+1a}$, $A_{-1a}$ shifted back and forth along a radial direction with respect to the main beams $A_0$ on the disk 5. Further, as shown in FIG. 3(a), ±1st-order diffracted rays $A_{+1c}$, $A_{-1c}$ diffracted in the third diffraction region of the diffracting element 2 are focused as 2-directional tracking error detection sub-beams $A_{+1c}$, $A_{-1c}$ shifted back and forth along a track direction with respect to the main beams $A_0$ on the disk 5. As the result, the main beams $A_0$ are focused on the center of a predetermined track 5a of the disk 5. The tilt error detection sub-beams $A_{+1a}$, $A_{-1a}$ are focused on positions shifted inward and outward along a radial direction with respect to this main beams $A_0$. Further, the tracking error detection sub-beams $A_{+1c}$, $A_{-1c}$ are focused on positions which is shifted back and forth in a tracking direction and slightly shifted inward and outward in a radial direction with respect to the main beams $A_0$.

Then individual reflected rays B reflected on the disk 5, as shown in FIG. 2(b) and FIG. 3(b), are diffracted in the second diffraction region 2b of the diffracting element 2 and the ±1st-order diffracted rays therein are focused on light receiving elements 6a-6e respectively.

And output signals $Sa_R$, $Sa_L$ from a main light receiving element $6a$ where reflected rays $B_0$ of the main beams $A_0$ are focused are added by means of an addition circuit 7 of signal detection circuits whereby the result is released as a reproduced information signal RF. These output signals $Sa_R$, $Sa_L$ are applied to a subtraction circuit 8 to be subtracted thereby whereby the result is released as an focusing error signal FE. Output signals Sd, Se from tracking error detection sub-light receiving elements $6d$, $6e$ where reflected rays $B_{+1c}$, $B_{-1c}$ of the tracking error detection sub-beams $A_{+1c}$, $A_{-1c}$ are focused are applied to a subtraction circuit 9 and the subtracted value therebetween is released as a tracking error signal TRE. Output signals $Sb_R$, $Sb_L$, $Sc_R$ and $Sc_L$ from tilt error detection sub-light receiving elements $6b$, $6c$ where reflected rays $B_{+1a}$, $B_{-1a}$ of the tilt error detection sub-beams $A_{+1a}$, $A_{-1a}$ are focused are added and then applied to a subtraction circuit 10 to be subtracted thereby and the subtracted value therebetween is released as a tilt error signal TLE.

How the tilt error signal TLE is detected by the use of this tilt error detection sub-beams $A_{+1a}$, $A_{-1a}$ is described below under reference to FIGS. 7 and 8.

Figure 7A:
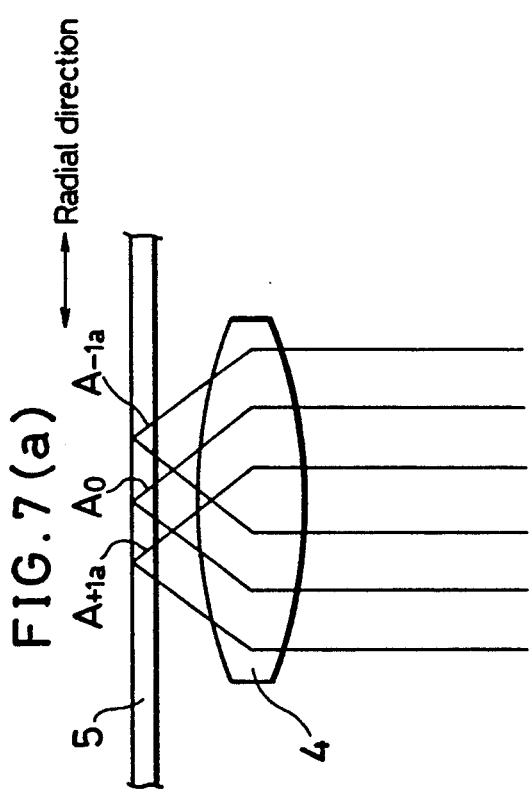
FIG. 7(a) is a front view showing tilt error detection sub-beams when the disk is flat.
Figure 8:
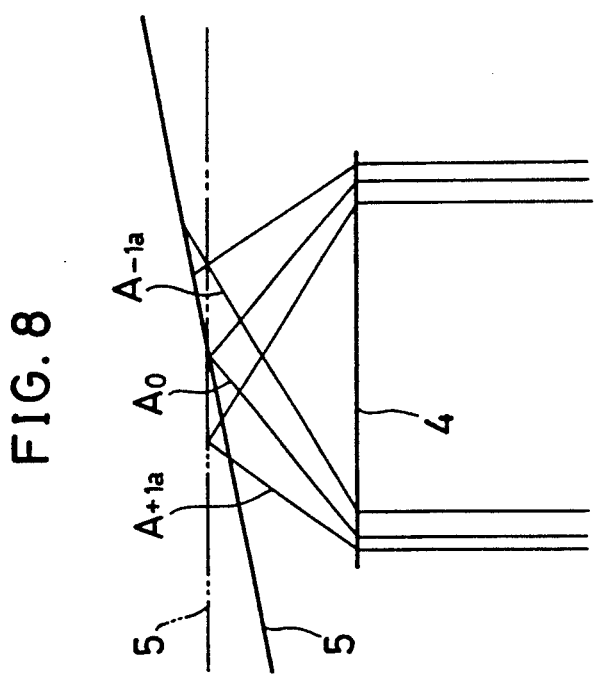

As shown in FIG. 7(a), when the disk 5 is flat, the tilt error detection sub-beams $A_{+1a}$, $A_{-1a}$ are in focus on positions shifted inward and outward along a radial direction respectively, in the condition that main beam $A_0$ is in focus by means of focusing servo according to the focusing error signal FE. Hence, since both tilt error detection sub-light receiving elements $6b$, $6c$ detect focusing conditions, the tilt error signal TLE according to difference therebetween becomes "0". And in this case a tilt angle of the optical pickup device is not adjusted.

Figure 7B:
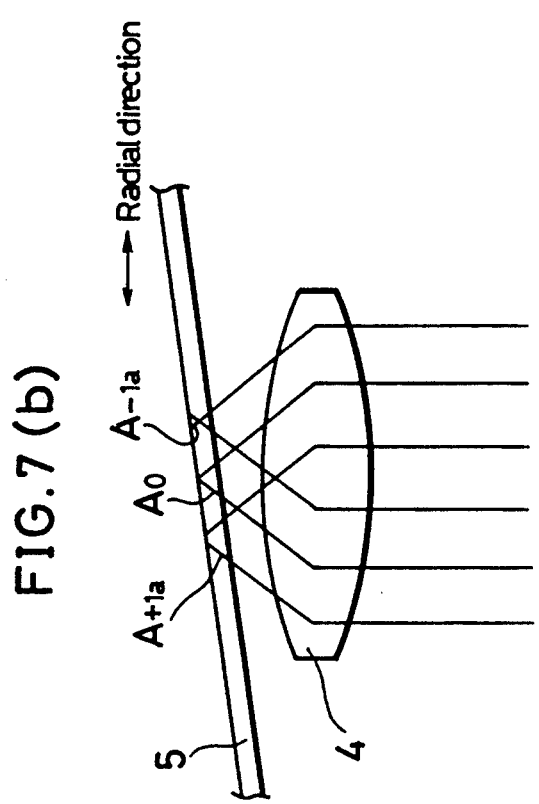
FIG. 7(b) is another front view showing the tilt error detection sub-beams when a peripheral portion of the disk is warped upward.

However when, as shown in FIG. 7(b), the disk 5 is inclined upward as being toward the outer periphery thereof, the tilt error detection sub-beams $A_{+1a}$, $A_{-1a}$ come to be in a defocused condition even when the main beam $A_0$ is in focus. As shown in FIG. 8 in detail, the tilt error detection sub-beam $A_{+1a}$ is in focus behind the disk 5, while the tilt error detection sub-beam $A_{-1a}$ is in focus not on the disk 5 but in front thereof. Therefore, the respective tilt error detection sub-light receiving elements $6b$, $6c$ detect focusing errors in the opposite direction, whereby the tilt error signal TLE according to the difference therebetween has a polarity corresponding to the tilting direction of the disk 5 and a value proportional to the degree of tilting. And in this case the tilt angle of the optical pickup device is adjusted by means of a tilting mechanism (not shown) so that the irradiated ray A is controlled to be irradiated on the disk 5 perpendicularly.

Figure 9:
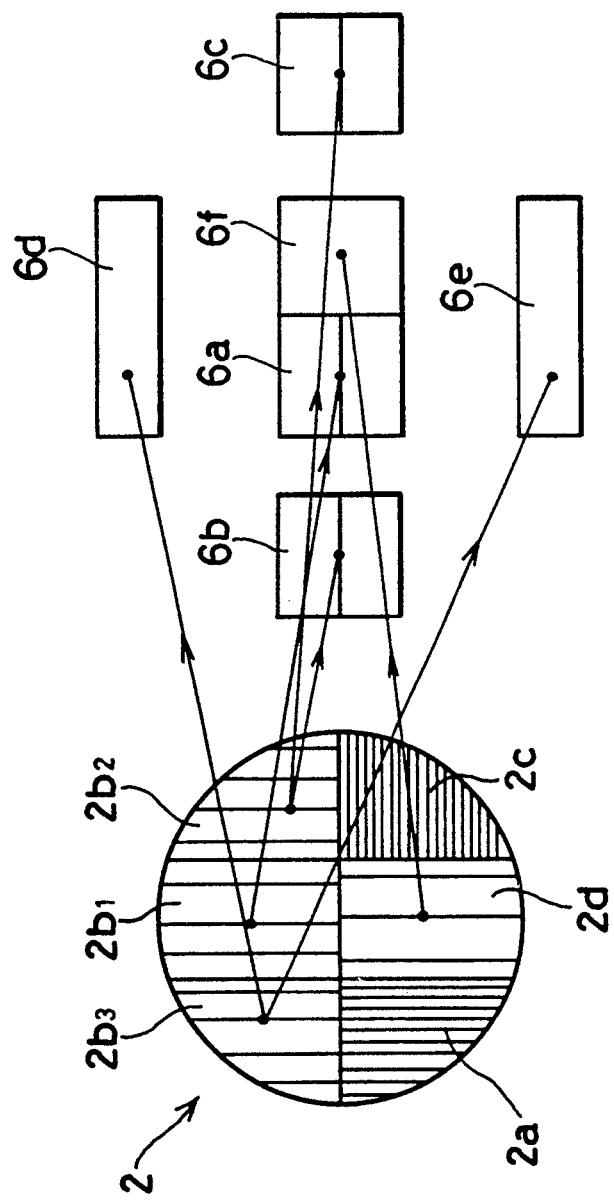
Figure 10:
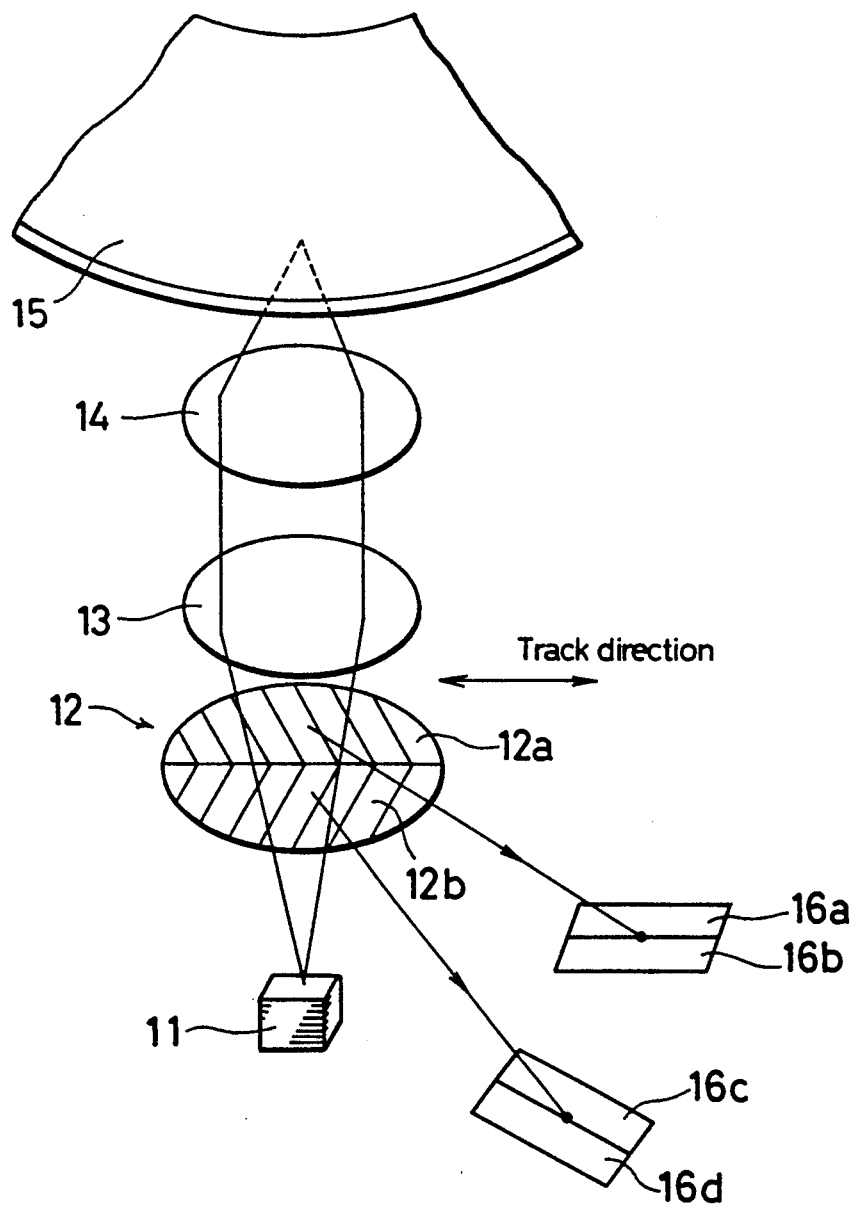
Figure 11:
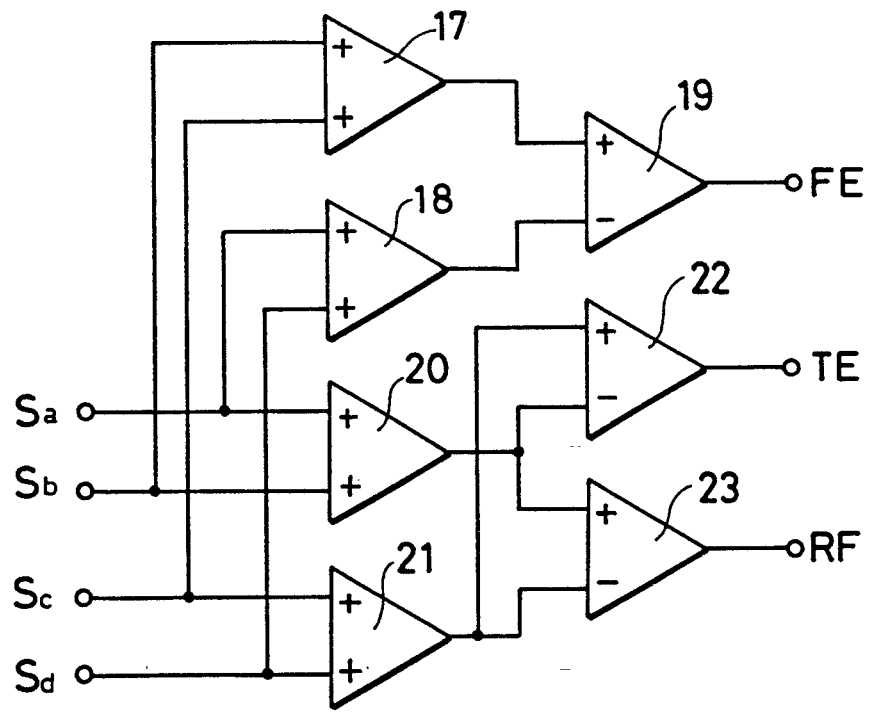
Figure 12:
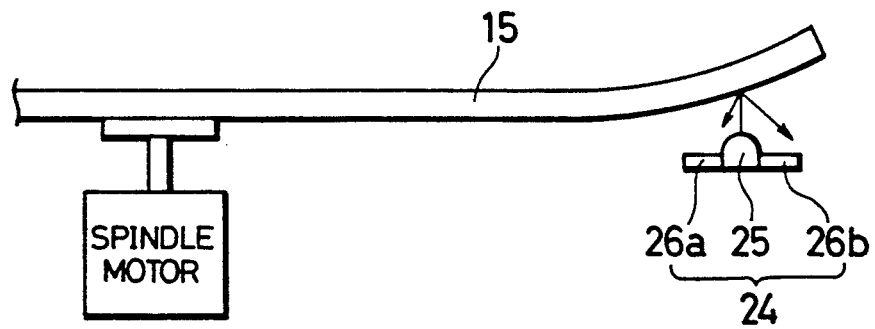
Figure 12:
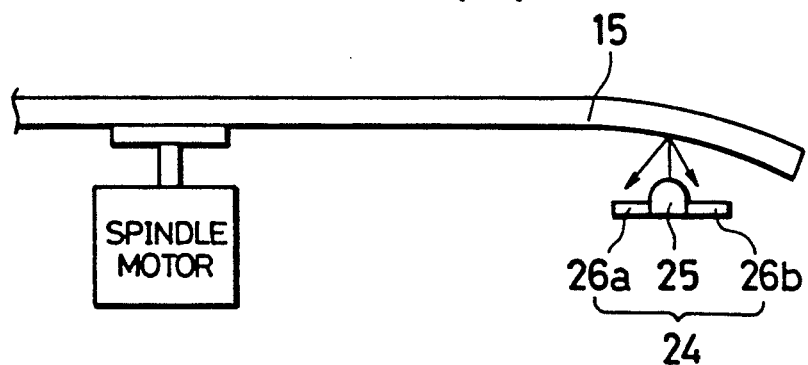
Figure 13:
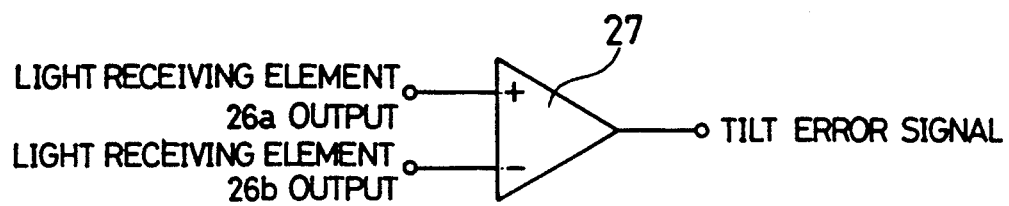

Although in this embodiment the diffracting element 2 where a diffraction area is divided into three regions is used, the diffracting element 2 may have any number of regions in the diffraction area provided that it includes at least a diffraction region for separating the tilt error detection sub-beam and another diffraction region for focusing the tilt error detection sub-beam on a predetermined tilt error detection sub-light receiving element. In FIG. 9, another construction of the diffraction element 2 where a diffraction area is divided into 6 regions. Therein a fourth diffraction region $2d$ for focusing the reflected ray of the main beam on a light receiving element $6f$ for detecting reproduced information signal is disposed between the first diffraction region $2a$ for separating the tilt error detection sub-beam and the third diffraction region $2c$ for separating the tracking error detection sub-beam. Also, the second diffraction region $2b$ is divided into three diffraction regions $2b_1$, $2b_2$, $2b_3$ for focusing the reflected rays of the main beam, the tilt error detection sub-beam and the tracking error detection sub-beam on the light receiving elements $6a$-$6e$ respectively.

Also, in the present embodiment, two tilt error detection sub-beams are utilized for detection by two tilt error detection sub-light receiving elements $6b$, $6c$ for an improved detection sensitivity. It is, however, possible to utilize either of the tilt error detection sub-beam $A_{+1a}$ or $A_{-1a}$ and tilt error detection sub-light receiving element $6b$ or $6c$ only for detection of the tilt error signal TLE, if these beams are focused on a position which is substantially distant from a position where the main beam is focused.

Further, in this embodiment the tracking error signal TRE is detected according to the 3-beam method using two tracking error detection sub-beams $A_{+1c}$, $A_{-1c}$. In this invention, however, a method of the tracking error signal TRE is arbitrary, and it is also possible to use the push-pull method utilizing the main beam $A_o$.

An optical pickup device of the present invention is, as mentioned above, that an irradiating ray emitted from a light emitting element is caused to focus on a recording medium, and a reflected ray reflected by this recording medium is focused on a light receiving element. Before the light emitting element and the light receiving element are disposed a diffracting element, and in this diffracting element are included at least a first diffraction region for separating the irradiating ray from the light emitting element into a main beam and sub-beams shifted from the main beam in a direction perpendicular to a track direction of the track where the main beam is focused and a second diffraction region which directs a reflected ray of the main beam reflected from the recording medium on a main light receiving element and irradiates reflected rays of the sub-beams on sub-light receiving elements, and an arithmetic circuit for detecting the tilt error signal showing the focusing condition of the sub-beam according to the output of this sub-light receiving elements is provided in the optical pickup device.

This enables doing detection of the tilt error signal without increasing the number of components of the optical pickup device. The initial adjustment for that, too, can be done simultaneous with that for the optics of the optical pickup device.

Hence, an optical pickup device according to the present invention does not require installment of any additional tilt sensor for detection of the tilt signal, and also enables prevention of the increasing the number of components and the increase of cost as a result of increased assembly steps and/or the required man-hours.

The above-mentioned diffracting element may also be made up of a plurality of divided diffraction regions.

The aforementioned diffraction region may as well be so formed that the 0th-order diffraction efficiencies of the individual diffraction regions are substantially equal eachother so that the main beams's distribution of the luminous intensity is symmetrical.

The aforementioned diffracting element may also as well comprise one of divided diffraction regions as a second diffraction region, a first diffraction region and a third diffraction region into which another diffraction region is further divided.

The aforementioned first diffraction region may also comprise a diffraction grating for separating the irradiating ray from the light emitting element into a 0th-order diffracted ray and ±1st-order diffracted rays.

The aforementioned third diffracted region may comprise a diffraction grating for separating the irradiating ray from the light emitting element into a 0th-order diffracted ray and ±1st-order diffracted rays shifted back and forth from the 0th-order ray along a track direction on a recording medium.

The aforementioned second diffraction region may as well be provided with the properties of a cylindrical lens.

The aforementioned optical pickup device may as well comprise a diffracting element, a collimator lens, an objective lens, a light receiving element and a light emitting element.

The aforementioned light receiving element may compris a main light receiving element and a plurality of sub-light receiving elements for detection of a tilt error.

The aforementioned plural sub-light receiving elements may as well comprise a plurality of tilt error detection sub-light receiving elements for detecting a tilt of the recording medium caused by a warp or the like and a plurality of tracking error detection sub-light receiving elements.

The aforementioned main light-receiving element may as well be divided into two regions and so be formed that the reflected rays of the sub-beams diffracted in the second diffraction region are focused onto the center of the parting line.

The aforementioned tilt error detection sub-light receiving element may as well be divided into two regions and be so formed that the reflected rays of the tilt error detection sub-beams diffracted in the second diffraction region are focused onto the center of the parting line.

The aforementioned tracking error detection sub-light receiving elements may as well have one light receiving region respectively and be so formed that the reflected rays of the tracking error detection sub-beams diffracted in the second diffraction region are focused thereon.

The aforementioned arithmetic circuit may as well comprise a subtraction circuit so that a tilt error signal is obtained according to the output signal from the tilt error detection sub-light receiving element.

The aforementioned diffracting element may as well comprise at least a diffraction region for separating the tilt error detection sub-beam and a diffraction region for letting the tilt error detection sub-beam focus on a predetermined tilt error detection sub-light receiving element.

What is claimed is:

1. An optical pickup device for focusing an irradiating ray from a light emitting element on a recording medium and for causing a reflected ray reflected from the recording medium to focus on a light receiving element, comprising:
    a diffracting element;
    said diffracting element including,
        a first diffraction region for separating the irradiating ray from the light emitting element into a main beam and sub-beams shifted from said main beam in a direction perpendicular to a track direction, said sub-beams for detecting an inclination of the recording medium, and
        a second diffraction region for directing a reflected ray of said main beam reflected from the recording medium onto a main light receiving element and for directing reflected rays of said sub-beams reflected from the recording medium onto sub-light receiving elements; and
    an arithmetic circuit for producing a tilt error signal, said tilt error signal indicating the inclination of the recording medium.

2. An optical pickup device as claimed in claim 1 wherein said first and second diffraction region are formed so that 0th-order diffraction efficiencies for said first and second diffraction regions are substantially equal so that a distribution of luminous intensity of the main beam is symmetrical.

3. An optical pickup device according to claim 1 wherein said diffracting element comprises one of the divided diffraction regions as a second diffraction region, a first diffraction region and a third diffraction region into which the other divided diffraction region is further divided.

4. An optical pickup device as claimed in claim 3 wherein said first diffraction region is provided with a diffracting grating for separating the irradiating ray released from the light emitting element into a 0th-order diffracted ray and 1st-order diffracted rays.

5. An optical pickup device as claimed in claim 3 wherein said third diffraction region is provided with a diffracting grating for separating the irradiating ray released from the light emitting element into a 0th-order diffracted ray and 1st-order diffracted rays shifted back and forth from said 0th-order diffracted ray along a track direction of the recording medium.

6. An optical pickup device as claimed in claim 3 wherein said second diffraction region is provided with properties of a cylindrical lens.

7. An optical pickup device as claimed in claim 1 further comprising:
    a collimator lens;
    an objective lens;
    a light receiving element; and
    a light emitting element.

8. An optical pickup device as claimed in claim 7 wherein said light receiving element comprising a main light receiving element and a plurality of sub-light receiving elements for detecting a tilt error.

9. An optical pickup device as claimed in claim 2 wherein said plurality of sub-light receiving elements comprise a plurality of tilt error detection sub-light receiving elements for detecting a tilt of the recording medium caused by warping and a plurality of tracking error detection sub-light receiving elements.

10. An optical pickup device as claimed in claim 8 wherein said main light receiving element is divided into two regions and is formed so that the reflected ray of said sub-beam diffracted in said second diffraction region is focused onto a center of a parting line.

11. An optical pickup device as claimed in claim 9 wherein each tilt error detection sub-light receiving element is divided into two regions and is formed so that a reflected ray of a tilt error detection sub-beam diffracted in said second diffraction region is focused onto a center of a parting line.

12. An optical pickup device as claimed in claim 9 wherein each tracking error detection sub-light receiving element has a light receiving region and are formed so that reflected rays of reflective tracking error detection sub-beams diffracted in said second diffracting region are focused thereon.

13. An optical pickup device as claimed in claim 1 wherein said arithmetic circuit comprising a subtraction circuit so that a tilt error signal is obtained according to the output signal from said tilt error detection sub-light receiving element.

14. An optical pickup device as claimed in claim 1 wherein said arithmetic circuit comprises a signal detecting circuit composed of an addition circuit and a subtraction circuit.

15. An optical pickup device as claimed in claim 1 wherein said diffracting element comprises a diffraction region for separating said tilt error detection sub-beam and a diffraction region for causing said tilt error detection sub-beam to focus on a predetermined tilt error detection sub-light receiving element.

16. An optical pickup device as claimed in claim 1 wherein said diffracting element is provided with properties of a condensing lens for condensing a reflected ray or an irradiating ray.

17. An optical pickup device as claimed in claim 1 wherein said diffracting element comprises:
 a third diffracting region for focusing the reflected ray of said main beam on the light receiving element in detecting reproduced information signals;
 said second diffraction region being divided into three diffraction regions, each region for causing the reflected rays of said main beam, a tilt error detecting sub-beam and a tracking error detecting sub-beam respectively to focus on individual light receiving elements.

* * * * *